US012708984B2

(12) United States Patent
Ha et al.

(10) Patent No.: US 12,708,984 B2
(45) Date of Patent: Aug. 18, 2026

(54) DRIVING DEVICE

(71) Applicant: SEMES CO., LTD., Cheonan-si (KR)

(72) Inventors: Inseok Ha, Cheonan-si (KR); Jinhyuck Yang, Cheonan-si (KR); Cheonsu Cho, Cheonan-si (KR); Yongkyu Cho, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 419 days.

(21) Appl. No.: 18/242,031

(22) Filed: Sep. 5, 2023

(65) Prior Publication Data

US 2025/0073853 A1 Mar. 6, 2025

(30) Foreign Application Priority Data

Sep. 5, 2022 (KR) ........................ 10-2022-0112344

(51) Int. Cl.

*B25B 5/06* (2006.01)
*G02F 1/13* (2006.01)
*B41J 29/377* (2006.01)

(52) U.S. Cl.

CPC ............... *B25B 5/06* (2013.01); *B41J 29/377* (2013.01); *G02F 1/1303* (2013.01)

(58) Field of Classification Search

CPC ........ B41J 3/407; B41J 29/377; B41J 25/001; B41J 2202/08; B41J 2202/09; G02F 1/1303

See application file for complete search history.

(56) References Cited

U.S. PATENT DOCUMENTS

| | | | | |
|---|---|---|---|---|
| 9,325,222 | B2 | 4/2016 | Shinohira et al. | |
| 2007/0177001 | A1 | 8/2007 | Morikawa et al. | |
| 2021/0331466 | A1* | 10/2021 | Ha | B41J 3/407 |
| 2024/0375399 | A1* | 11/2024 | Tsuji | B41J 25/34 |

FOREIGN PATENT DOCUMENTS

| | | |
|---|---|---|
| JP | 60-046268 | 3/1985 |
| KR | 10-0351967 | 9/2002 |
| KR | 10-2007-0054056 | 5/2007 |
| KR | 10-2011-0002682 | 1/2011 |
| KR | 10-1535331 | 7/2015 |
| KR | 10-2022-0071759 | 5/2022 |

OTHER PUBLICATIONS

Notice of Allowance from Korean Intellectual Property Office dated Nov. 9, 2024.

Office Action from the Korean Intellectual Property Office dated Feb. 20, 2024.

* cited by examiner

*Primary Examiner* — Angela M. Medich

(57) ABSTRACT

The present disclosure provides a driving device including a driving member including a power source, a slider configured to linearly move according to power supply form the power source, a guide member coupled to the slider and configured to provide a movement path to the slider, and a bracket coupled to the slider, wherein the bracket is divided into a first bracket and a second bracket separated from each other by a first gap, and includes a first cooling member configured to cool the first bracket and a second cooling member configured to cool the second bracket, and the driving member includes a third cooling member configured to cool the power source.

17 Claims, 8 Drawing Sheets

DRIVING DEVICE

CROSS-REFERENCE TO RELATED APPLICATION

This application is based on and claims priority under 35 U.S.C. § 119 to Korean Patent Application No. 10-2022-0112344, filed on Sep. 5, 2022, in the Korean Intellectual Property Office, the disclosure of which is incorporated by reference herein in its entirety.

BACKGROUND

1. Field

The disclosure relates to a driving device and a head assembly including the same, and more particularly, to a driving device that improves the accuracy of dispensing a chemical liquid and a head assembly including the same.

2. Description of the Related Art

A liquid crystal display device for displaying an image includes two substrates on which various thin films are deposited and a liquid crystal layer interposed between the two substrates. In general, the thin films formed on each substrate have patterns of various shapes, and thus, the thin films are formed through a deposition process and a photolithography process for pattern precision. In this way, because a photolithography process using an expensive mask is used to form one thin film, the manufacturing cost is high and the manufacturing process time is long.

Recently, as an alternative method to form a thin film, a thin film formation method using an inkjet printing method has been used. Because a thin film is formed in the inkjet printing method by applying a chemical liquid to a specific location on a substrate, a separate etching process is not required. Such an inkjet printing method may be used to form a color filter or an alignment layer of a liquid crystal display device.

SUMMARY

Provided is a driving device of which deformation is prevented by improving the heat generation characteristics as a first technical problem.

Provided is a head assembly of which deformation is prevented by improving the heat generation characteristics as a second technical problem.

The disclosure is not limited to those mentioned above, and other problems not mentioned will be clearly understood by those skilled in the art from the description below.

Additional aspects will be set forth in part in the description which follows and, in part, will be apparent from the description, or may be learned by practice of the presented embodiments of the disclosure.

The disclosure provides a driving device to address the first technical problem.

According to an aspect of the disclosure, a driving device includes a driving member including a power source, a slider configured to linearly move according to power supply from the power source, a guide member coupled to the slider and configured to provide a movement path to the slider, and a bracket coupled to the slider, wherein the bracket is divided into a first bracket and a second bracket separated from each other by a first gap, and includes a first cooling member configured to cool the first bracket and a second cooling member configured to cool the second bracket, and the driving member includes a third cooling member configured to cool the power source.

In one embodiment of the present disclosure, the first gap may be formed so that the first bracket and the second bracket are separated from each other in a direction parallel to a moving direction of the slider.

In one embodiment of the present disclosure, the first gap may be formed so that the first bracket and the second bracket are separated from each other in a direction perpendicular to the moving direction of the slider.

In one embodiment of the present disclosure, the first bracket may have a rectangular shape according to the first gap, and the second bracket is separated from the first bracket in both directions parallel to and perpendicular to the moving directions of the slider.

In one embodiment of the present disclosure, the first cooling member, the second cooling member, and the third cooling member may each include a cooling passage.

In one embodiment of the present disclosure, a fluid passing through the third cooling member may have a lower temperature than a fluid passing through the first cooling member and the second cooling member.

In one embodiment of the present disclosure, the driving device may further include a controller configured to control each of the first to third cooling members to be switched between an operation mode and a non-operation mode.

In one embodiment of the present disclosure, the controller may further be configured to control the first to third cooling members to operate when the slider moves, and controls at least one of the first to third cooling members not to operate when the slider stops.

In one embodiment of the present disclosure, the first gap may disappear by thermal expansion of each of the first bracket and the second bracket.

In one embodiment of the present disclosure, the driving device may further include at least one inkjet head coupled to the bracket and configured to dispense a chemical liquid toward a substrate.

The disclosure provides a head assembly to achieve the technical problems.

According to an aspect of the disclosure, a head assembly includes a chuck configured to support a substrate, a driving device including a driving member including a power source, a slider configured to linearly move according to power supply from the power source, a guide member configured to provide a movement path to the slider coupled to the slider, and a bracket coupled to the slider, and at least one inkjet head coupled to the bracket and configured to dispense a chemical liquid toward the substrate, wherein the bracket is divided into a first bracket and a second bracket separated from each other by a first gap, and includes a first cooling member configured to cool the first bracket and a second cooling member configured to cool the second bracket, and the driving member includes a third cooling member configured to cool the power source.

In one embodiment of the present disclosure, the first gap may be formed so that the first bracket and the second bracket are separated from each other in a direction parallel to a moving direction of the slider.

In one embodiment of the present disclosure, the first cooling member, the second cooling member, and the third cooling member may each include a cooling passage.

In one embodiment of the present disclosure, a temperature of the third cooling member may be lower than a temperature of the first cooling member and the second cooling member.

In one embodiment of the present disclosure, the head assembly may further include a controller configured to control each of the first to third cooling members to be switched between an operation mode and a non-operation mode.

In one embodiment of the present disclosure, the controller may further be configured to control the first to third cooling members to operate when the slider moves, and control at least one of the first to third cooling members not to operate when the slider stops.

In one embodiment of the present disclosure, the first gap may disappear by thermal expansion of each of the first bracket and the second bracket.

The disclosure provides a head assembly to achieve the technical problems.

According to another aspect of the disclosure, a head assembly includes a chuck configured to support a substrate, a driving device including a driving member including a power source, a slider configured to linearly move according to power supply from the power source, a guide member configured to provide a movement path to the slider coupled to the slider, and a bracket coupled to the slider, at least one inkjet head coupled to the bracket and configured to dispense a chemical liquid toward the substrate, and a controller, wherein the bracket is divided into a first bracket and a second bracket separated from each other by a first gap, and includes a first cooling member configured to cool the first bracket and a second cooling member configured to cool the second bracket, and the driving member includes a third cooling member configured to cool the power source, a temperature of the third cooling member is lower than a temperature of the first cooling member and the second cooling member, and the controller may further be configured to control each of the first to third cooling members to switch between an operation mode and a non-operation mode.

In one embodiment of the present disclosure, the first gap may disappear by thermal expansion of each of the first bracket and the second bracket.

In one embodiment of the present disclosure, the controller may further be configured to control the first to third cooling members to operate when the slider moves, and controls at least one of the first to third cooling members not to operate when the slider stops.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
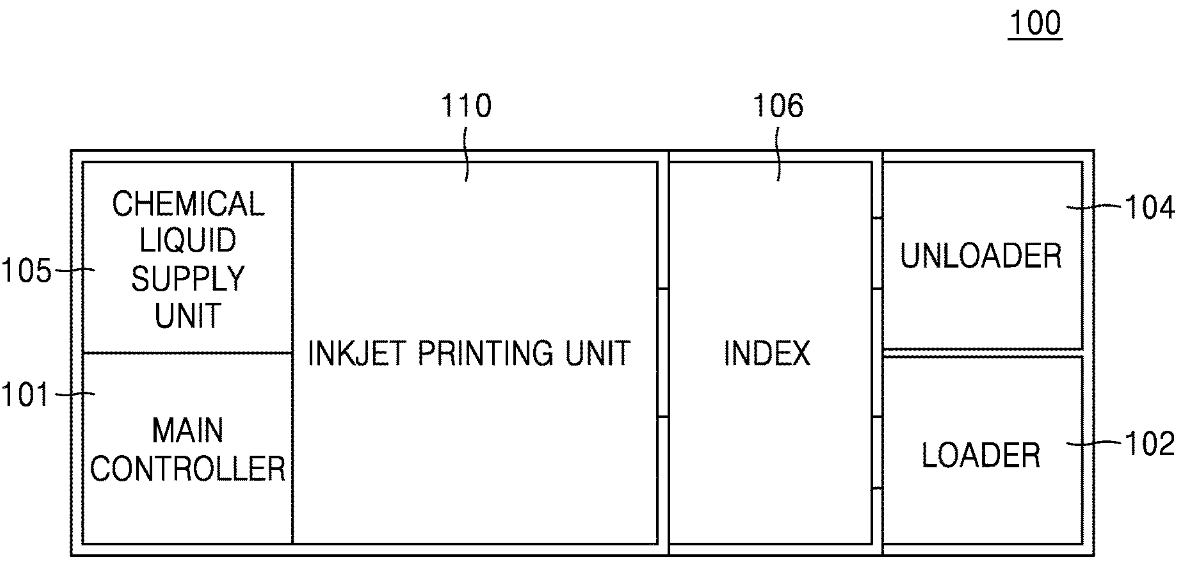
FIG. 1 is a schematic diagram showing a configuration of a chemical liquid dispensing device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Reference will now be made in detail to embodiments, examples of which are illustrated in the accompanying drawings. In the drawings, like reference numerals refer to like elements throughout, and repetitive descriptions are omitted.

Figure 2:
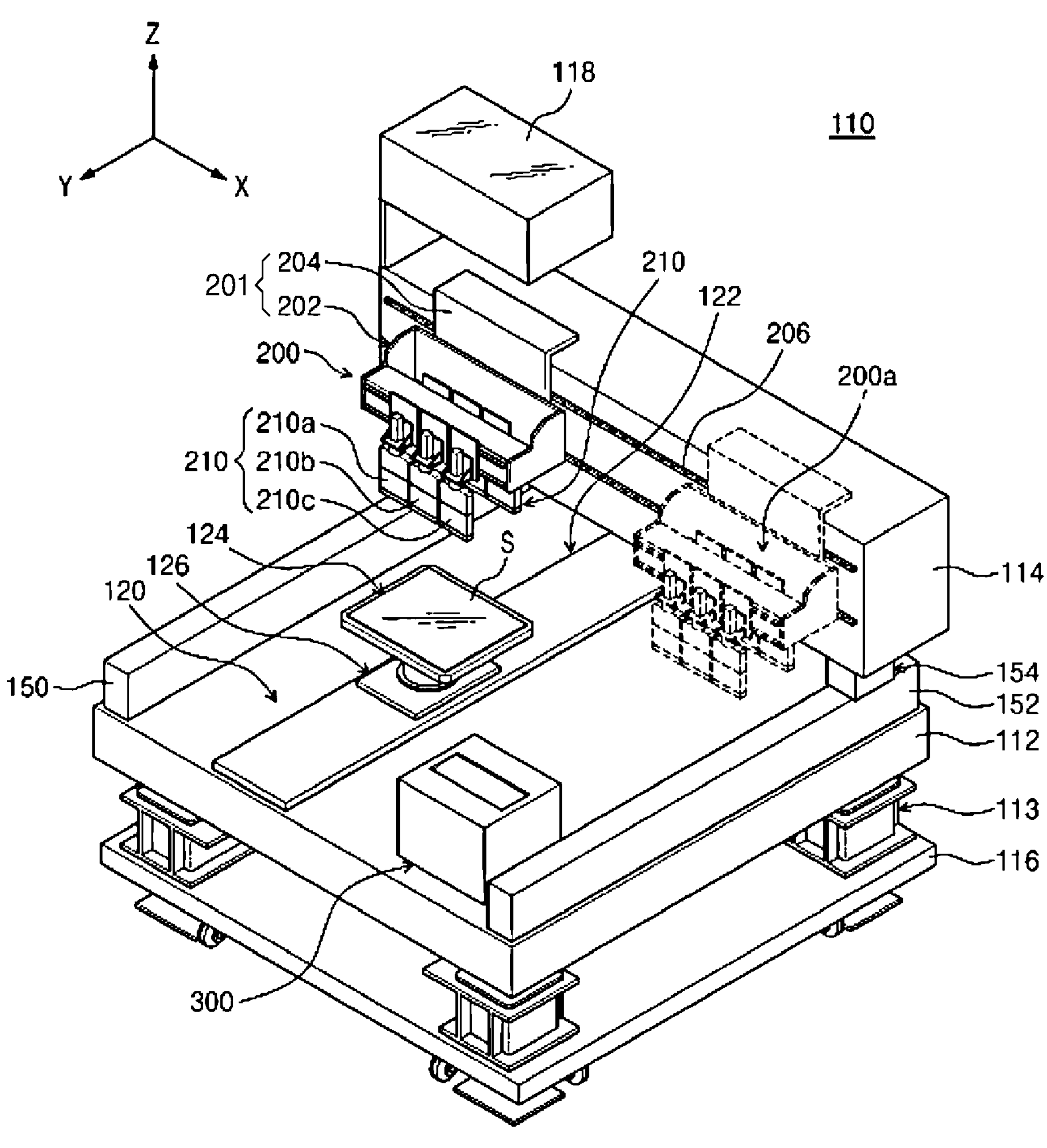
FIG. 2 is a perspective view schematically illustrating an inkjet printing unit.
Figure 3:
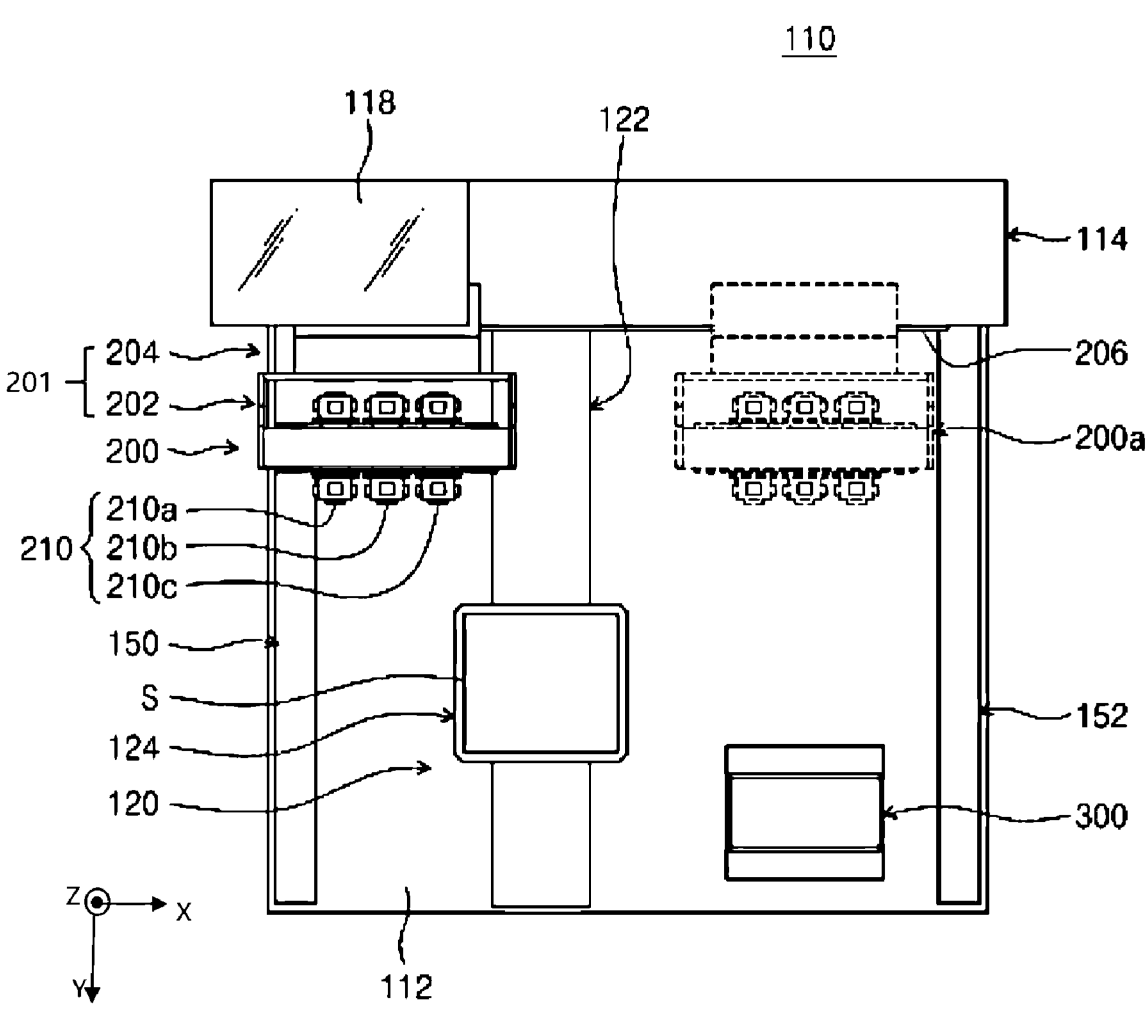
FIG. 3 is a schematic plan view illustrating an inkjet printing unit.

FIG. 1 is a schematic diagram showing a configuration of a chemical liquid dispensing device 100 according to an embodiment. FIG. 2 is a perspective view schematically illustrating an inkjet printing unit 110. FIG. 3 is a schematic plan view illustrating the inkjet printing unit 110.

Referring to FIG. 1, the chemical liquid dispensing device 100 is a device for dispensing a chemical liquid to an upper surface of an object (not shown) using an inkjet method, and includes an inkjet printing unit 110 according to an embodiment. The object may include a glass substrate for manufacturing a rectangular flat plate, for example, a color filter or an alignment film for a chemical liquid display panel, a printed circuit board for forming a metal thin film on a circuit pattern, a plate for printing a chemical liquid by using an inkjet method, and the like.

The chemical liquid application device 100 may include an inkjet printing unit 110 that prints a substrate surface in an inkjet method, a loader 102 on which a plurality of substrates are loaded, an index 106 for taking out substrates from the loader 102 and supplying them to the inkjet printing unit 110, and an unloader 104 for loading substrates on which a chemical liquid dispensing is completed.

The index 106 may be provided with a transfer robot (not shown) that transfers substrates between the loader 102, the inkjet printing unit 110, and the unloader 104. The chemical liquid dispensing device 100 may include a chemical liquid supply unit 105 for supplying a chemical liquid to the inkjet printing unit 110. In addition, the chemical liquid dispensing device 100 may include a main controller 101 that controls an overall operation of the chemical liquid dispensing device 100 as an electric controller.

Referring to FIGS. 2 and 3, the inkjet printing unit 110 is a device for dispensing a chemical liquid to a surface of a substrate S in an inkjet method, and may include a base 116 including a steel material, a stage 112 disposed above the base 116, a head assembly 200 having a plurality of inkjet heads 210 disposed above the stage 112 and dispensing a chemical liquid to the surface of the substrate S seated on the stage 112, and a gantry 114 supporting the head assembly 200. In addition, the inkjet printing unit 110 may include a plurality of anti-vibration members 113 to block vibration between the base 116 and the stage 112.

The head assembly 200 may be provided as a Multi Head Array (MHA) unit. The head assembly 200 may include a plurality of inkjet heads 210*a*, 210*b*, and 210*c* that discharge a chemical liquid in an inkjet method and a driving device 201. The driving device 201 may include a bracket 202 on which the inkjet heads 210 are installed, and a driver 204 coupled to the bracket 202 to move the head assembly 200 in at least one direction.

The plurality of inkjet heads 210 may be installed, for example, in two rows on front and rear surfaces of the bracket 202. That is, the plurality of inkjet heads 210 may be disposed parallel to each other on both front and rear surfaces of the bracket 202 in a Y-axis direction. Each of the inkjet heads 210 may be connected to the chemical liquid supply unit 105 (refer to FIG. 1) to receive chemical liquids. According to example embodiments, each of the inkjet heads 210 may be supplied with the same or different chemical liquids.

The inkjet heads 210 are devices for dispensing a chemical liquid to the surface of the substrate S, and each of the inkjet heads 210 may have a head provided at a lower end thereof. The head may have a nozzle surface provided with a plurality of nozzles (not shown) for supplying a chemical liquid to the substrate S on a lower surface of the head facing the surface of the substrate S. Each of the nozzles may individually discharge a chemical liquid to the substrate S.

In the following drawings, an X-axis direction and a Y-axis direction represent directions parallel to upper or lower surface of the substrate S, and the X-axis direction and the Y-axis direction may be directions perpendicular to each other. A Z-axis direction may indicate a direction perpendicular to the surface of the upper or lower surface of the substrate S. In other words, the Z-axis direction may be a direction perpendicular to an X-Y plane.

Also, in the following drawings, a first horizontal direction, a second horizontal direction, and a vertical direction may be understood as follows. The first horizontal direction may be understood as a Y-axis direction, a second horizontal direction may be understood as an X-axis direction, and a vertical direction may be understood as a Z-axis direction.

The inkjet heads 210 may respectively supply any one of R color, G color, and B color chemicals when the object is the substrate S for a color filter. In this case, the chemical liquid may be inks of R color, G color, and B color. The inkjet heads 210 respectively supplying R color, G color, and B color chemicals may be disposed adjacent to each other.

The driver 204 is coupled to the bracket 202 on which the inkjet heads 210 are installed, and may include first guide members 150 and 152 that move the head assembly 200 in a first horizontal direction (Y), a second guide member 206 that moves the head assembly 200 in a second horizontal direction (X), and a driving member 205. The driver 204 may move the head assembly 200 in the first horizontal direction (Y), the second horizontal direction (X), and a vertical direction (Z). In addition, the driver 204 may rotate the inkjet heads 210 with respect to their respective central axes.

The stage 112 is provided as a stone table, and may include a chucking unit 120 disposed on one side of an upper surface of the stone table to chuck the substrate S and a maintenance zone disposed on the other side of the upper surface of the stone table to clean the head assembly 200. The chucking unit 120 may include a chuck 124 that linearly moves toward the index 106 to receive the substrate S, and when the substrate S is seated, chucks (the substrate S?) and moves to an opposite side of the index 106, that is, to a position where the chemical liquid is dispensed to the substrate S, a chuck driver 126 that moves the chuck 124 in at least one linear direction or rotates the chuck 124, and a third guide member 122 for guiding the chuck 124 to linearly move. A lower part of the chuck 124 may be coupled to the chuck driver 126 and may be linearly moved in the Y-axis direction along the third guide member 122.

In addition, the first guide members 150 and 152 are installed on the stage 112 to correspond to both ends of the gantry 114. The first guide members 150 and 152 extend in the Y-axis direction and have the same width as the stage 112. The first guide members 150 and 152 are provided long at both ends of an upper surface of the stage 112 in the Y-axis direction to linearly move the gantry 114 in the Y-axis direction.

The gantry 114 may be coupled to the driver 204 on one side thereof and sliders 154 may be coupled on both lower sides thereof. The driving member 205 may be provided inside the gantry 114. The driving member 205 may provide power to move the head assembly 200 in the first horizontal direction (Y) or the second horizontal direction (X). That is, the driving member 205 may provide power so that the linear motion of the bracket 202 coupled to the driver 204 is possible. The driving member 205 may include, for example, a motor, a gear, a pulley, a belt, a ball screw, or a linear motor, but is not limited thereto.

A pressure controller 118 may be installed on one side of an upper surface of the gantry 114 to control general operations of the inkjet printing unit 110, such as pressure control, chemical liquid supply and dispense. The gantry 114 may have the same width as the stage 112 in the X-axis direction. That is, the gantry 114 may be coupled to the sliders 154 at both lower ends, and the sliders 154 may be movable in the Y-axis direction along the first guide members 150 and 152. In addition, the gantry 114 may move the head assembly 200 in the X-axis direction by linearly moving the bracket 202 in the X-axis direction through the driver 204.

Also, the pressure controller 118 includes a meniscus pressure control (MPC) unit for regulating an internal pressure of the inkjet head 210*s*. The pressure controller 118 adjusts the internal pressure of the inkjet heads 210 to a negative pressure, and, when a chemical liquid is supplied, controls a plurality of piezoelectric elements (not shown) individually to uniformly dispense the chemical liquid from the respective nozzles.

In order to clean the inkjet heads 210, the inkjet printing unit 110 moves the head assembly 200 to a position 200*a* corresponding to the maintenance zone.

A head cleaning device 300 is provided in the maintenance zone. When the head assembly 200 is moved to another side of the stage 112 by moving in the X-axis direction by the driver 204, the head cleaning device 300 moves in the Y-axis direction so that the inkjet heads 210 are positioned above a chemical liquid cleaning device. Because the inkjet heads 210 move in a straight line while maintaining a certain distance above the chemical liquid cleaning device, thus, a chemical liquid remaining on nozzle surfaces of the inkjet heads 210 may be removed in a non-contact manner.

In this way, the head cleaning device 300 may be provided to remove a chemical liquid remaining on nozzle surfaces of heads in a non-contact manner.

Figure 4:
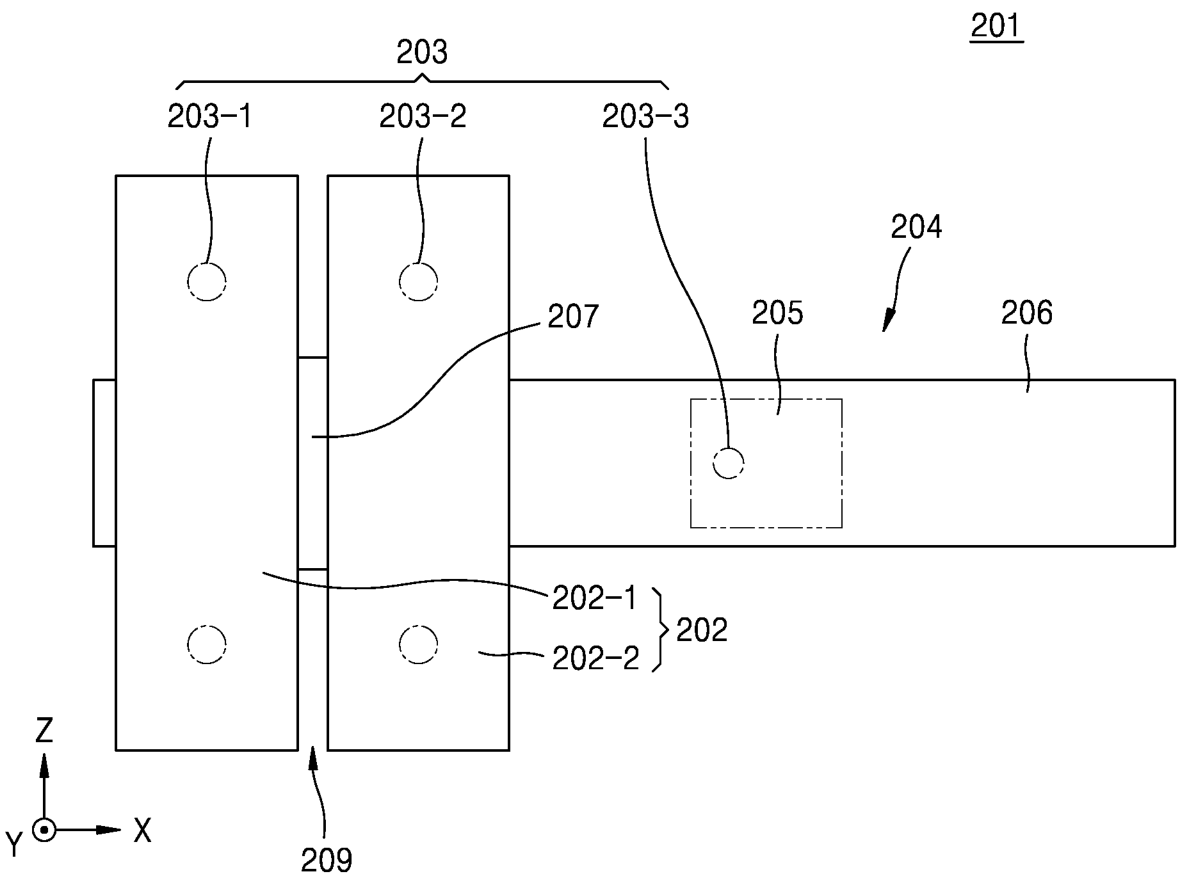
FIG. 4 is a front view schematically illustrating a driving device of the inkjet printing unit of FIG. 2.
Figure 5:
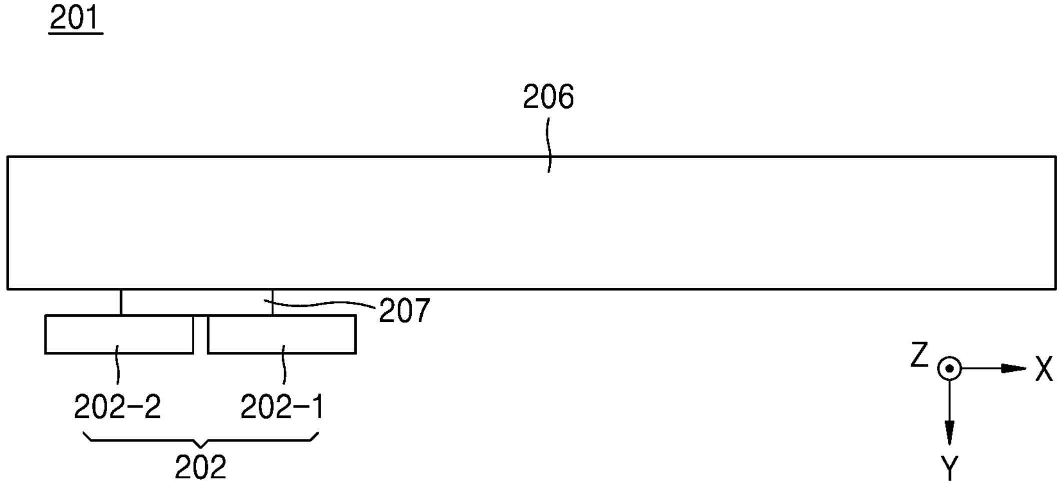
FIG. 5 is a plan view schematically illustrating a driving device of the inkjet printing unit of FIG. 2.

FIG. 4 is a front view schematically showing a driving device of the inkjet printing unit 110 of FIG. 2, and FIG. 5 is a plan view schematically showing a driving device of the inkjet printing unit 110 of FIG. 2. For convenience of illustration, the inkjet heads 210 coupled to the bracket 202 are omitted in FIGS. 4 and 5.

Referring to FIGS. 4 and 5, the driving device 201 may include the driver 204 and the bracket 202.

The driver 204 may include the driving member 205, the second guide member 206, and a slider 207. The driving member 205 is provided in the second guide member 206 and may provide power to move the bracket 202 in the first horizontal direction (Y) or the second horizontal direction (X). The driving member 205 may provide power so that a linear movement of the bracket 202 coupled to the driver 204 is possible. The driving member 205 may include, for example, a motor, a gear, a pulley, a belt, a ball screw, or a linear motor, but is not limited thereto. Because the driving member 205 provides a power source for a linear movement of the slider 207 and the bracket 202 coupled to the slider 207, the driving member 205 may generate a large amount of heat.

The second guide member 206 may be configured to provide a moving path for the slider 207. According to example embodiments, the second guide member 206 may extend in the second horizontal direction X, and the driving member 205 may be disposed inside the second guide member 206, but the arrangement of the driving member 205 is not limited thereto, and the driving member 205 may be disposed outside the second guide member 206.

In FIGS. 4 to 8, a structure coupled to the slider 207 and providing a movement path of the slider 207 is shown as the second guide member 206, but is not limited thereto, and the structure may also include the first guide members 150 and 152 (refer to FIG. 1).

The slider 207 may be coupled to the second guide member 206 in the first horizontal direction (Y) or the vertical direction (Z), which is a direction perpendicular to a direction in which the second guide member 206 extends.

The slider 207 may linearly move in the second horizontal direction (X) by power provided by the driving member 205. For example, as power is supplied to the driving member 205, the slider 207 may linearly move in the second horizontal direction (X). The slider 207 may linearly move in a direction in which the second guide member 206 extends. According to example embodiments, the slider 207 may linearly move on the second guide member 206 along a rail provided to the second guide member 206. In FIGS. 4 and 5, it is illustrated that the slider 207 is coupled to the second guide member 206 in the first horizontal direction (Y) and has as a shape extending in the second horizontal direction (X), but is limited thereto. However, the slider 207 may be coupled to the second guide member 206 in the vertical direction (Z), and may have a shape extending in the first horizontal direction (Y) or vertical direction (Z).

The bracket 202 may be coupled to slider 207. According to example embodiments, the bracket 202 may be coupled to the slider 207 in the first horizontal direction (Y), but is not limited thereto. The bracket 202 may be coupled to the slider 207 and may be moved in the second horizontal direction (X) by a linear movement of the slider 207. The bracket 202 may provide a space for mounting the inkjet heads 210.

A first gap 209 may be formed in the bracket 202. The bracket 202 may be divided into a first bracket 202-1 and a second bracket 202-2 by the first gap 209. The first bracket 202-1 and the second bracket 202-2 may be separated from each other by the first gap 209.

According to example embodiments, the bracket 202 may include the first gap 209 crossing the bracket 202 in the vertical direction (Z). That is, the bracket 202 may be divided into the first bracket 202-1 and the second bracket 202-2 separated from each other in the second horizontal direction (X) by the first gap 209.

The first gap 209 may be formed as much as a length expanding the first bracket 202-1 and the second bracket 202-2 by heat generated by the driving member 205.

According to example embodiments, the first gap 209 may have the same width as the length formed by expanding the first bracket 202-1 and the second bracket 202-2 when the first bracket 202-1 and the second bracket 202-2 reach a maximum temperature by the driving member 205. According to example embodiments, the first gap 209 may disappear due to thermal expansion of the first bracket 202-1 and the second bracket 202-2. That is, the first gap 209 may be offset by thermal expansion of the first bracket 202-1 and the second bracket 202-2.

In the drawings of this specification, it is shown that the bracket 202 is divided into two parts, that is, the first bracket 202-1 and the second bracket 202-2, by the first gap 209, but is not limited thereto and the bracket 202 may be divided into three or more parts by added gaps.

The driving device 201 may further include a cooling unit 203. The cooling unit 203 may include a first cooling member 203-1, a second cooling member 203-2, and a third cooling member 203-3.

The first cooling member 203-1 may be configured to cool the first bracket 202-1. According to example embodiments, the first cooling member 203-1 may cool the first bracket 202-1 to T1 which is a first temperature. According to example embodiments, the first cooling member 203-1 may be formed within the first bracket 202-1.

The second cooling member 203-2 may be configured to cool the second bracket 202-2. According to example embodiments, the second cooling member 203-2 may cool the second bracket 202-2 to T2 which is a second temperature. According to example embodiments, the second cooling member 203-2 may be formed within the second bracket 202-2.

The third cooling member 203-3 may be configured to cool the driving member 205. According to example embodiments, the third cooling member 203-3 may cool the driving member 205 to T3 which is a third temperature. According to example embodiments, the third cooling member 203-3 may be formed in the driving member 205, and specifically, the third cooling member 203-3 may be formed near a coil when the driving member 205 is a motor.

According to example embodiments, the third temperature T3 may be lower than the first temperature T1 and the second temperature T2. That is, the third cooling member 203-3 may be configured to absorb more heat than the first cooling member 203-1 and the second cooling member 203-2. Accordingly, the first cooling member 203-1 and the second cooling member 203-2, which have a constant temperature, are provided near the first bracket 202-1 and the second bracket 202-2, and the third cooling member 203-3 having a lower temperature than the first cooling member 203-1 and the second cooling member 203-2 may be provided near the driving member 205. According to example embodiments, a fluid passing through the third cooling member 203-3 may have a lower temperature than a fluid passing through the first cooling member 203-1 and the second cooling member 203-2.

According to example embodiments, the cooling unit 203 may include a cooling passage. The cooling unit 203 may cool the first bracket 202-1, the second bracket 202-2, and the driving member 205 by a fluid passing through the cooling passage. The fluid may include cooling water, but is not limited thereto.

The driving device 201 according to the present disclosure may be divided into the first bracket 202-1 and the second bracket 202-2 by forming the first gap 209 in the bracket 202, and may include the cooling unit 203 for cooling the first bracket 202-1, the second bracket 202-2, and the driving member 205. Heat generated by the driving member 205 may be easily dissipated by the cooling unit 203 to prevent heat from being transferred to the bracket 202. In addition, even if heat is transferred to the bracket 202, the transferred heat may be dissipated before the bracket 202 is deformed by the first cooling member 203-1 and the second cooling member 203-2, and even when the bracket 202 is deformed, the bracket 202 may be prevented from being damaged by the first gap 209 formed in the bracket 202. Accordingly, it is possible to prevent the position of the inkjet head 210 provided on the bracket 202 from being deformed, and ultimately, the chemical liquid may be accurately dispensed to a desired position of the substrate S through the inkjet heads 210.

Figure 6:
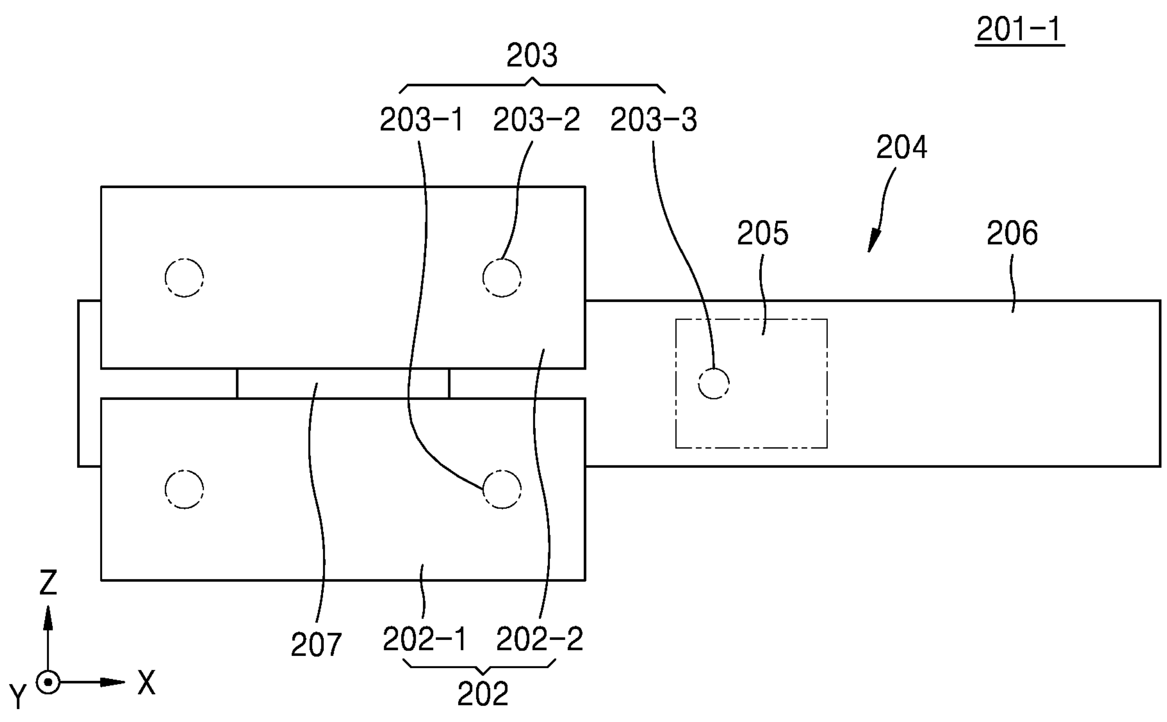
FIGS. 6 to 8 are schematic diagrams illustrating a driving device according to example embodiments of the disclosure.

FIG. 6 is a schematic diagram illustrating a driving device 201-1 according to an embodiment of the disclosure. Hereinafter, overlapping descriptions of the driving device 201 of FIG. 4 and the driving device 201-1 of FIG. 6 will be omitted and the differences will be mainly described.

Referring to FIG. 6, the driving device 201-1 may include a driving unit 204 and a bracket 202. The driving unit 204 may include a driving member 205, a second guide member 206, and a slider 207, and the bracket 202 may include a first gap 209, a first bracket 202-1, and a second bracket 202-2.

According to example embodiments, the first gap 209 may extend in the second horizontal direction (X). Accordingly, the first bracket 202-1 and the second bracket 202-2 may be separated in the vertical direction (Z).

Figure 7:
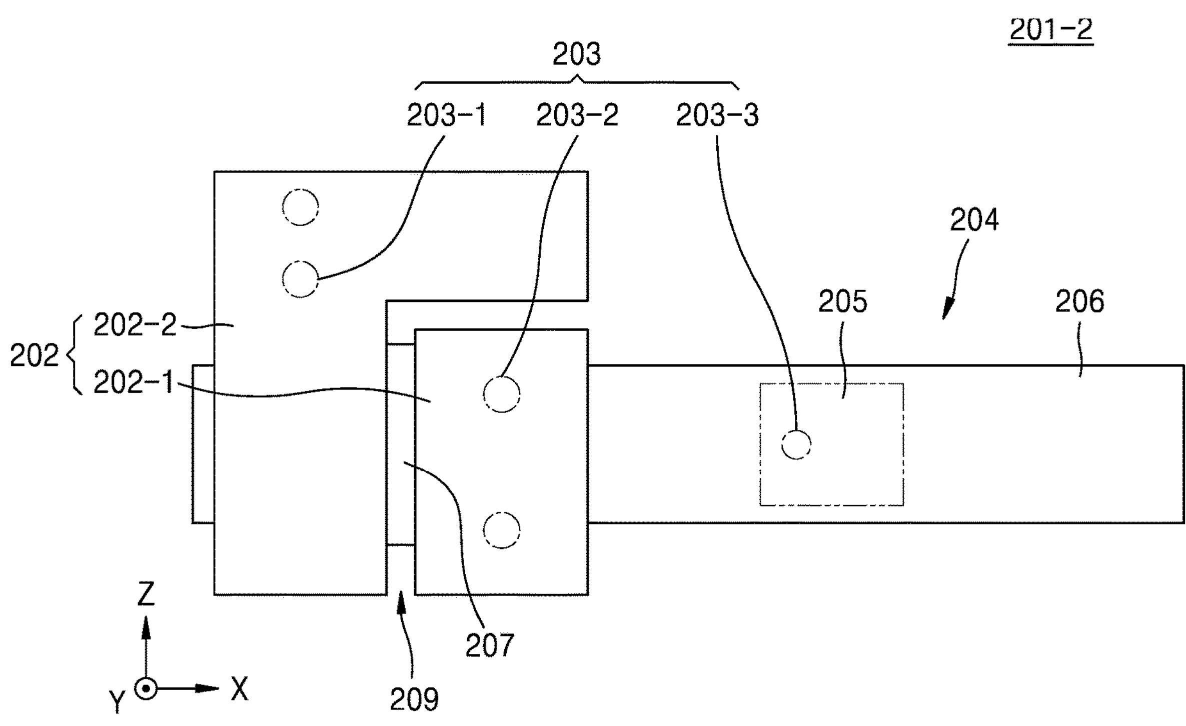

FIG. 7 is a schematic diagram schematically illustrating a driving device 201-2 according to an embodiment of the disclosure Hereinafter, overlapping descriptions of the driving device 201 of FIG. 4 and the driving device 201-2 of FIG. 7 will be omitted and the differences will be mainly described.

Referring to FIG. 7, the driving device 201-2 may include a driving unit 204 and a bracket 202. The driving unit 204 may include a driving member 205, a second guide member 206, and a slider 207, and the bracket 202 may include a first gap 209, a first bracket 202-1, and a second bracket 202-2.

The second bracket 202-2 may be separated from the first bracket 202-1 in the second horizontal direction (X) and the vertical direction (Z) by the first gap 209. According to example embodiments, the first bracket 202-1 may have a rectangular shape and the second bracket 202-2 may have a "T" shape due to the first gap 209.

In addition, the shape of the first gap 209 is not limited to FIGS. 4 to 7, that is, the first gap 209 may be formed such that the first bracket 202-1 is provided in a rectangular shape, and the second bracket 202-2 surrounds the first bracket 202-1. That is, the second bracket 202-2 may have an annular shape.

Figure 8:
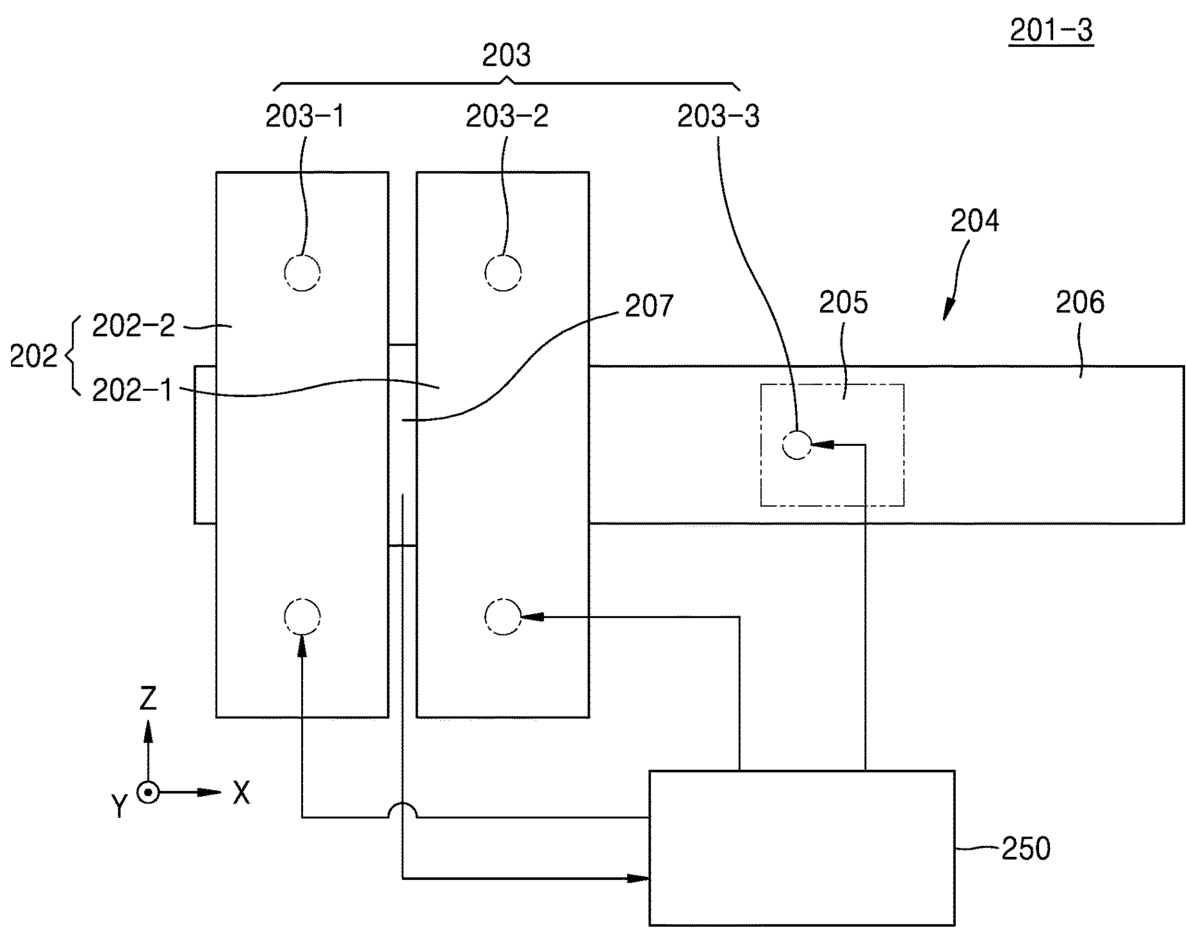

FIG. 8 is a schematic diagram illustrating a driving device 201-3 according to an embodiment of the disclosure. Hereinafter, overlapping descriptions of the driving device 201 of FIG. 4 and the driving device 201-3 of FIG. 8 will be omitted, and the differences will be mainly described.

Referring to FIG. 8, the driving device 201-3 may include a driving unit 204, a bracket 202 and a controller 250. The driving unit 204 may include a driving member 205, a second guide member 206, and a slider 207, and the bracket 202 may include a first gap 209, a first bracket 202-1, and a second bracket 202-2.

The controller 250 may control a cooling unit 203 to switch between operation and non-operation. According to example embodiments, the controller 250 may control each of the first to third cooling members 203-1, 203-2, and 203-3 to switch between operation and non-operation.

According to example embodiments, the controller 250 may control all of the first to third cooling members 203-1, 203-2, and 203-3 to operate when the slider 207 moves, and may control at least one of the first to third cooling members 203-1, 203-2, and 203-3 not to operate when the slider 207 is stopped. Accordingly, it is possible to cool the drive device 201-3 more efficiently.

The controller 250 may be implemented in hardware, firmware, software, or any combination thereof. For example, the controller 250 may include a computing device, such as a workstation computer, a desktop computer, a laptop computer, a tablet computer, etc. The controller 250 may include a simple controller, a complex processor, such as a microprocessor, CPU, or GPU, a processor configured by software, or dedicated hardware or firmware. The controller 250 may be implemented by, for example, a general-purpose computer or application-specific hardware, such as a Digital Signal Process (DSP), Field Programmable Gate Array (FPGA), and Application Specific Integrated Circuit (ASIC). Controller 250 may be implemented as instructions stored on a machine readable medium that may be read and executed by one or more processors. Here, the machine-readable medium may include an arbitrary mechanism for storing and/or transmitting information in a form readable by a machine (e.g., a computing device). For example, the machine-readable media may include read only memory (ROM), random access memory (RAM), magnetic disk storage media, optical storage media, flash memory devices, electrical, optical, acoustic or other forms of propagation signals (e.g. carrier waves, infrared signals, digital signals, etc.) and any other signals.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A driving device comprising:
a driving member including a power source;
a slider configured to linearly move according to power supply from the power source;
a guide member coupled to the slider and configured to provide a movement path to the slider; and
a bracket coupled to the slider,
wherein the bracket is divided into a first bracket and a second bracket separated from each other by a first gap,
wherein the bracket includes a first cooling member configured to cool the first bracket and a second cooling member configured to cool the second bracket,
wherein the driving member includes a third cooling member configured to cool the power source,
wherein the first cooling member, the second cooling member, and the third cooling member each include a cooling passage, and
wherein a fluid passing through the third cooling member has a lower temperature than a fluid passing through the first cooling member and the second cooling member.

2. The driving device of claim 1,
wherein the first gap is formed so that the first bracket and the second bracket are separated from each other in a direction parallel to a moving direction of the slider.

3. The driving device of claim 1, wherein the first gap is formed so that the first bracket and the second bracket are separated from each other in a direction perpendicular to a moving direction of the slider.

4. The driving device of claim 1, wherein the first bracket has a rectangular shape according to the first gap, and the second bracket is separated from the first bracket in directions parallel to and perpendicular to a moving directions of the slider.

5. The driving device of claim 1, further comprising a controller configured to control each of the first to third cooling members to be switched between an operation mode and a non-operation mode.

6. The driving device of claim 5, wherein the controller is further configured to control the first to third cooling members to operate when the slider moves, and control at least one of the first to third cooling members not to operate when the slider stops.

7. The driving device of claim 1, wherein the first gap disappears by thermal expansion of each of the first bracket and the second bracket.

8. The driving device of claim 1, further comprising at least one inkjet head coupled to the bracket and configured to dispense a chemical liquid toward a substrate.

9. A head assembly comprising:
a chuck configured to support a substrate;
a driving device including a driving member including a power source;
a slider configured to linearly move according to power supply from the power source;
a guide member configured to provide a movement path to the slider coupled to the slider;
a bracket coupled to the slider; and
at least one inkjet head coupled to the bracket and configured to dispense a chemical liquid toward the substrate,
wherein the bracket is divided into a first bracket and a second bracket separated from each other by a first gap, and includes a first cooling member configured to cool the first bracket and a second cooling member configured to cool the second bracket,
wherein the driving member includes a third cooling member configured to cool the power source,
wherein the first cooling member, the second cooling member, and the third cooling member each include a cooling passage, and
wherein a fluid passing through the third cooling member has a lower temperature than a fluid passing through the first cooling member and the second cooling member.

10. The head assembly of claim 9, wherein the first gap is formed so that the first bracket and the second bracket are separated from each other in a direction parallel to a moving direction of the slider.

11. The head assembly of claim 10, wherein the first gap disappears by thermal expansion of each of the first bracket and the second bracket.

12. The head assembly of claim 9, wherein a temperature of the third cooling member is lower than a temperature of the first cooling member and the second cooling member.

13. The head assembly of claim 9, further comprising a controller configured to control each of the first to third cooling members to be switched between an operation mode and a non-operation mode.

14. The head assembly of claim 13, wherein the controller is further configured to control the first to third cooling members to operate when the slider moves, and control at least one of the first to third cooling members not to operate when the slider stops.

15. A head assembly comprising:
a chuck configured to support a substrate;
a driving device including a driving member including a power source, a slider configured to linearly move according to power supply from the power source, a guide member configured to provide a movement path to the slider coupled to the slider, and a bracket coupled to the slider;
at least one inkjet head coupled to the bracket and configured to dispense a chemical liquid toward the substrate; and
a controller,
wherein the bracket is divided into a first bracket and a second bracket separated from each other by a first gap, and includes a first cooling member configured to cool the first bracket and a second cooling member configured to cool the second bracket,
wherein the driving member includes a third cooling member configured to cool the power source,
wherein a temperature of the third cooling member is lower than a temperature of the first cooling member and the second cooling member, and
wherein the controller is further configured to control each of the first to third cooling members to switch between an operation mode and a non-operation mode.

16. The head assembly of claim 15, wherein the first gap disappears by thermal expansion of each of the first bracket and the second bracket.

17. The head assembly of claim 15, wherein the controller is further configured to control the first to third cooling members to operate when the slider moves, and control at least one of the first to third cooling members not to operate when the slider stops.

* * * * *